United States Patent
Honda

(10) Patent No.: US 10,574,847 B2
(45) Date of Patent: Feb. 25, 2020

(54) TRANSPORT APPARATUS AND IMAGE FILE GENERATION METHOD FOR IMAGE READING APPARATUS

(71) Applicant: SEIKO EPSON CORPORATION, Tokyo (JP)

(72) Inventor: Daisuke Honda, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/403,702

(22) Filed: May 6, 2019

(65) Prior Publication Data

US 2019/0342461 A1 Nov. 7, 2019

(30) Foreign Application Priority Data

May 7, 2018 (JP) .................................. 2018-089376

(51) Int. Cl.
H04N 1/00 (2006.01)

(52) U.S. Cl.
CPC ..... *H04N 1/00729* (2013.01); *H04N 1/00684* (2013.01); *H04N 1/00771* (2013.01); *H04N 1/00777* (2013.01)

(58) Field of Classification Search
CPC ................................................ H04N 1/00684
See application file for complete search history.

(56) References Cited

U.S. PATENT DOCUMENTS

| 2007/0296138 | A1* | 12/2007 | Su | ............................ | B65H 1/04 |
| | | | | | 271/109 |
| 2008/0298867 | A1* | 12/2008 | Watanabe | .......... | G03G 15/6538 |
| | | | | | 399/407 |

FOREIGN PATENT DOCUMENTS

JP 2015-000804 A 1/2015

* cited by examiner

*Primary Examiner* — Lennin R RodriguezGonzalez
(74) *Attorney, Agent, or Firm* — Global IP Counselors, LLP

(57) ABSTRACT

An image reading apparatus includes a transport section configured to transport at least one sheet of paper along a transport path; a sonic wave detection section including a sonic wave transmitter and a sonic wave receiver that are disposed at positions between which the transport path is interposed, the sonic wave detection section being configured to output an output signal having a value that varies in accordance with a reception intensity with which the sonic wave receiver has received a sonic wave transmitted from the sonic wave transmitter; and a controller configured to determine a possibility of an occurrence of multi-feeding based on a result of comparing an output signal by the sonic wave detection section and two threshold value.

12 Claims, 11 Drawing Sheets

TRANSPORT APPARATUS AND IMAGE FILE GENERATION METHOD FOR IMAGE READING APPARATUS

The present application is based on, and claims priority from JP Application Serial Number 2018-089376, filed May 7, 2018, the disclosure of which is hereby incorporated by reference herein in its entirety.

BACKGROUND

1. Technical Field

The present disclosure relates to a transport apparatus that determines the occurrence of multi-feeding of paper, and to an image file generation method for an image reading apparatus.

2. Related Art

Heretofore, as one of techniques of this kind, there has been known a technique disclosed in JP-A-2015-000804. In this JP-A-2015-000804, there is disclosed a paper transport apparatus that, when the actual transition of detection signals output from a multi-feeding detection sensor does not correspond to the profile of detection signals for a single envelop, determines that multi-feeding of envelops has occurred.

Such a multi-feeding determination method disclosed in JP-A-2015-000804, however, has been applicable only to paper, such as the envelop, for which a profile can be prepared, and thus, there has been room for an improvement.

SUMMARY

According to an aspect of the present disclosure, a transport apparatus includes a transport section configured to transport at least one sheet of paper along a transport path; a sonic wave detection section including a sonic wave transmitter and a sonic wave receiver that are disposed at positions between which the transport path is interposed, the sonic wave detection section being configured to output an output signal having a value that varies in accordance with a reception intensity with which the sonic wave receiver has received a sonic wave transmitted from the sonic wave transmitter; and a controller configured to determine that a second case has a higher possibility of an occurrence of multi-feeding than a first case, the first case being a case in which, during the transport of the at least one sheet of paper, a first output signal corresponding to a reception intensity smaller than a first threshold value and larger than a second threshold value and a second output signal corresponding to a reception intensity smaller than the second threshold value have been output for an identical sheet of paper among the at least one sheet of paper, the second case being a case in which, during the transport of the at least one sheet of paper, a third output signal corresponding to a reception intensity larger than the first threshold value and the second output signal have been output for an identical sheet of paper among the at least one sheet of paper.

According to another aspect of the present disclosure, a transport apparatus includes a transport section configured to transport at least one sheet of paper along a transport path; an acquisition section configured to acquire a kind of the at least one sheet of paper; a sonic wave detection section including a sonic wave transmitter and a sonic wave receiver that are disposed at positions between which the transport path is interposed, the sonic wave detection section being configured to output an output signal having a value that varies in accordance with a reception intensity with which the sonic wave receiver has received a sonic wave transmitted from the sonic wave transmitter; and a controller configured to determine that a second case has a higher possibility of an occurrence of multi-feeding than a first case, the first case being a case in which the at least one sheet of paper of the acquired kind is at least one sheet of paper of a first kind and an output signal corresponding to a reception intensity smaller than a threshold value has been output during the transport of the at least one sheet of paper, the second case being a case in which the at least one sheet of paper of the acquired kind is at least one sheet of paper of a second kind different from the first kind and an output signal corresponding to the reception intensity smaller than the threshold value has been output during the transport of the at least one sheet of paper.

According to another aspect of the present disclosure, an image file generation method for an image reading apparatus that generates an image file by reading at least one sheet of paper transported along a transport path includes a sonic wave detection process in which a sonic wave transmitter transmits a sonic wave, a sonic wave receiver receives the sonic wave, the sonic wave transmitter and the sonic wave receiver being disposed at positions between which the transport path is interposed, and the sonic wave receiver outputs an output signal having a value that varies in accordance with a reception intensity with which the sonic wave receiver has received the sonic wave; and a generation process in which, when, during the transport of the at least one sheet of paper, a first output signal corresponding to a reception intensity smaller than a first threshold value and larger than a second threshold value and a second output signal corresponding to a reception intensity smaller than the second threshold value have been output for an identical sheet of paper among the at least one sheet of paper, an image signal including a scan image based on a result of the reading of the at least one sheet of paper and multi-feeding occurrence determination information indicating that there is a possibility of an occurrence of multi-feeding is generated, and when, during the transport of the at least one sheet of paper, the second output signal and a third output signal corresponding to a reception intensity larger than the first threshold value have been output for an identical sheet of paper among the at least one sheet of paper, the image signal is not generated.

According to another aspect of the present disclosure, an image file generation method for an image reading apparatus that generates an image file by reading at least one sheet of paper transported along a transport path includes an acquisition process in which a kind of the at least one sheet of paper is acquired; a sonic wave detection process in which a sonic wave transmitter transmits a sonic wave, a sonic wave receiver receives the sonic wave, the sonic wave transmitter and the sonic wave receiver being disposed at positions between which the transport path is interposed, and the sonic wave receiver outputs an output signal having a value that varies in accordance with a reception intensity with which the sonic wave receiver has received the sonic wave; and a generation process in which, when the at least one sheet of paper of the acquired kind is at least one sheet of paper of a first kind and, during the transport of the at least one sheet of paper, an output signal corresponding to a reception intensity smaller than a threshold value has been output, an image signal including a scan image based on a result of the reading of the at least one sheet of paper and multi-feeding occurrence determination information indicating that there is a possibility of an occurrence of multi-feeding is generated, and when the at least one sheet of paper of the acquired kind is at least one sheet of paper of a second kind different from the first kind and, during the transport of the at least one sheet of paper, an output signal corresponding to the reception intensity smaller than the threshold value has been output, the image signal is not generated.

DESCRIPTION OF EXEMPLARY EMBODIMENTS

First Embodiment

Hereinafter, a transport apparatus and an image file generation method for an image reading apparatus that are according to an embodiment of the present disclosure will be described based on the accompanying drawings. In the present embodiment, as the transport apparatus and the image reading apparatus, a sheet feed scanner that performs scanning of a document while transporting the document will be exemplified.

Figure 1:
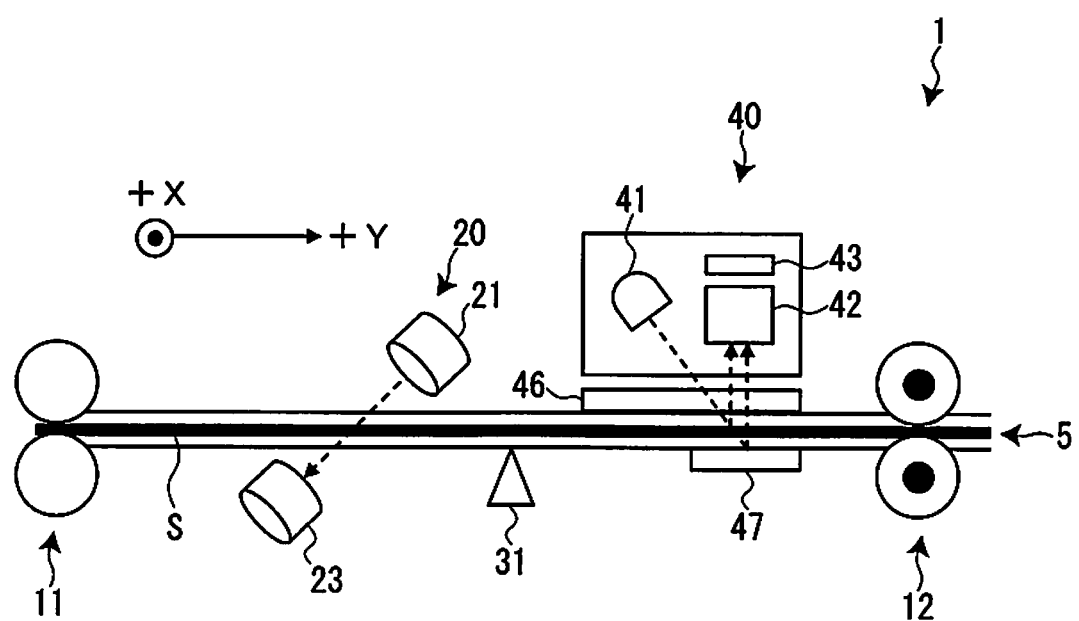
FIG. 1 is a diagram illustrating the configuration of a vicinity of a transport path of an image reading apparatus.

FIG. 1 is a diagram illustrating the configuration of a vicinity of a transport path of an image reading apparatus 1. In the image reading apparatus 1, a transport path 5 is formed as the transport path along which paper S is transported. In the present embodiment, the paper S is assumed to be cut paper. Further, a pair of separation rollers 11, a sonic wave detection section 20, a paper sensor 31, an image reading section 40, and a pair of transport rollers 12 are disposed along the transport path 5. Further, a platen glass 46, namely, a platen glass having light transmittance, and a paper holding plate 47 are oppositely disposed at a position on the transport path 5, at which the image reading section 40 faces the transport path 5.

The pair of separation rollers 11 is disposed further upstream than the sonic wave detection section 20, that is, further toward a −Y side than the sonic wave detection section 20, in a transport direction in which the paper S is transported. The pair of separation rollers 11 includes a driving roller and a driven roller, and feeds a sheet of paper S onto the transport path 5 while separating the sheet of paper S on a sheet-by-sheet basis from a plurality of stacked sheets of paper S.

The sonic wave detection section 20 is disposed further upstream than the paper sensor 31, that is, further toward the −Y side than the paper sensor 31, in the transport direction of the paper S. The sonic wave detection section 20 includes a sonic wave transmitter 21 and a sonic wave receiver 23, and the sonic wave transmitter 21 and the sonic wave receiver 23 are oppositely disposed at positions between which the transport path 5 is interposed. The sonic wave transmitter 21 transmits ultrasonic waves toward the paper S being transported along the transport path 5. Upon transmission of the ultrasonic waves from the sonic wave transmitter 21 toward the paper S, ultrasonic waves are secondarily emitted from the back side of the paper S. The sonic wave receiver 23 receives the secondarily emitted ultrasonic waves. At this time, the attenuation ratio of the relevant ultrasonic waves when the paper S is thick or has a large basic weight becomes larger than that when the paper S is thin or has a small basic weight, and thus, the reception intensity of ultrasonic waves received by the sonic wave receiver 23 decreases. Further, when the multi-feeding of the paper S is occurring, the attenuation ratio of the relevant ultrasonic waves further increases, and thereby, the reception intensity of the ultrasonic waves received by the sonic wave receiver 23 further decreases. Through the utilization of this property, a controller 100 determines the kind of paper S and the occurrence of multi-feeding of the paper S based on the values of output signals output from the sonic wave receiver 23. Note that, in the present embodiment, it is assumed that the further the reception intensity of the sonic wave receiver 23 increases, the further the value of the output signal thereof also increases.

Note that the above example process in which, in the sonic wave detection section 20, ultrasonic waves are transmitted from the sonic wave transmitter 21 toward the paper S; the sonic wave receiver 23 receives ultrasonic waves that are secondarily emitted by the ultrasonic waves having been transmitted from the sonic wave transmitter 21; and the sonic wave receiver 23 outputs its output signal in proportion to the reception intensity of the received ultrasonic waves is an example of "a sonic wave detection process" in the present disclosure.

In this case, when the ultrasonic waves are emitted toward the paper S, a portion of the relevant ultrasonic waves is reflected and is diffusely reflected between the paper S and the sonic wave transmitter 21. The reflected waves having been diffusely reflected may enter the sonic wave receiver 23 as noise elements, and this phenomenon may become a cause that degrades the detection accuracy. For this reason, the sonic wave transmitter 21 is disposed so as to allow the ultrasonic waves to be emitted obliquely to the paper S. Further, with this configuration, the sonic wave receiver 23 is also disposed obliquely to the paper S so as to face the front of the sonic wave transmitter 21. Even when the sonic wave transmitter 21 and the sonic wave receiver 23 are disposed obliquely to the paper S in such a way as described above, the sonic wave transmitter 21 and the sonic wave receiver 23 can be regarded to be provided at the positions between which the transport path 5 is interposed, provided that, in a thickness direction of the paper S, the paper S passes between the sonic wave transmitter 21 and the sonic wave receiver 23.

The paper sensor 31 is disposed further upstream than the image reading section 40, that is, further toward the −Y side than the image reading section 40, in the transport direction of the paper S. The paper sensor 31 detects the anterior-edge position and the posterior-edge position of the paper S.

The image reading section 40 is disposed further upstream than the pair of transport rollers 12, that is, further toward the −Y side than the pair of transport rollers 12, in the transport direction of the paper S. The image reading section 40 includes a light source 41, a lens array 42, and an image sensor 43. Further, the paper holding plate 47 provided at a position where the transport path 5 is interposed between the image reading section 40 and the paper holding plate 47 suppresses paper floating of the paper S and thereby prevents the occurrence of emission unevenness. Further, the paper holding plate 47 also functions as a white reference plate for use in setting a white reference value at which the output of the image sensor 43 becomes a maximum value. Light rays having been emitted from the light source 41 pass through the platen glass 46, and then, are emitted to either the paper S that is passing on the transport path 5 or the paper holding plate 47. Reflected light rays from either the paper S or the paper holding plate 47 pass through the lens array 42, and enter the image sensor 43.

The pair of transport rollers 12 is disposed further downstream than the image reading section 40, that is, further toward a +Y side than the image reading section 40, in the transport direction of the paper S. The pair of transport rollers 12 includes a driving roller and a driven roller, and transports the paper S along the transport path 5 in a +Y direction.

Figure 2:
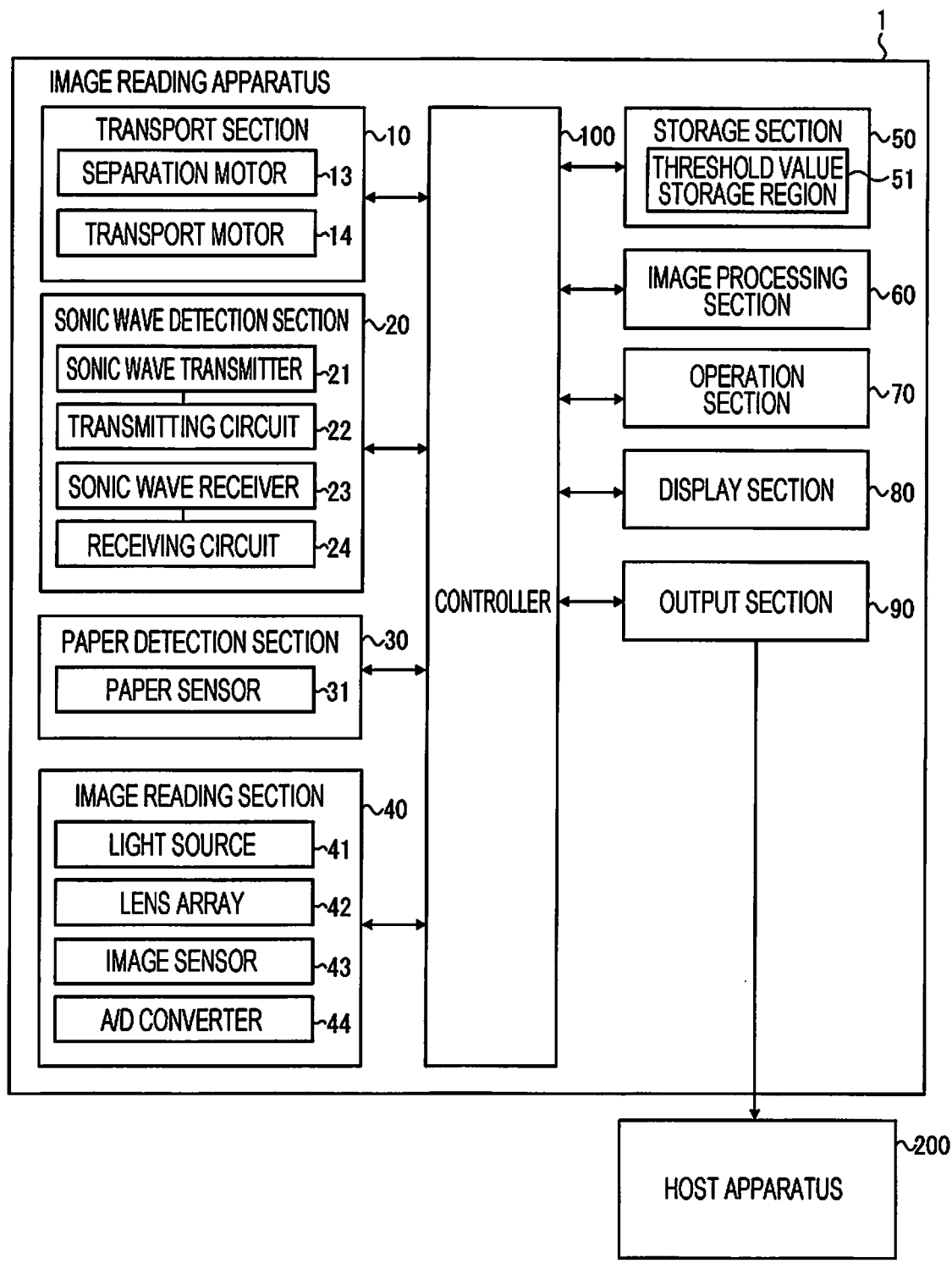
FIG. 2 is a block diagram illustrating a control system of an image reading apparatus.

FIG. 2 is a block diagram illustrating a control system of the image reading apparatus 1. The image reading apparatus 1 includes a transport section 10, the sonic wave detection section 20, a paper detection section 30, the image reading section 40, a storage section 50, an image processing section 60, an operation section 70, a display section 80, an output section 90, and the controller 100. Note that the display section 80 is an example of "a notification section" in the present disclosure.

The transport section 10 includes a separation motor 13 and a transport motor 14. The separation motor 13 drives the driving roller of the pair of separation rollers 11. The driven roller of the pair of separation rollers 11 includes an unillustrated torque limiter, and receives driving torque that is applied by the torque limiter in a rotation direction opposite a rotation direction at the time of the transport of the paper S. The driving of the driving roller in a state in which the driven roller receives the driving torque, which is applied by the torque limiter, causes a sheet of paper S existing at the highest layer among the stacked sheets of paper S to be fed out onto the transport path 5. Meanwhile, the transport motor 14 drives the driving roller of the pair of transport rollers 12. Further, the driven roller of the pair of transport rollers 12 is caused to rotate by being driven by the driving roller. In this way, the sheet of paper S is transported along the transport path 5 in the +Y direction.

The sonic wave detection section 20 includes a transmitting circuit 22 and a receiving circuit 24, in addition to the above-described sonic wave transmitter 21 and sonic wave receiver 23. The transmitting circuit 22 amplifies a driving pulse output from the controller 100, and inputs the amplified driving pulse into the sonic wave transmitter 21. The sonic wave transmitter 21 transmits the ultrasonic waves based on the driving pulse having been input from the transmitting circuit 22. Meanwhile, the receiving circuit 24 outputs an output signal in proportion to the reception intensity of ultrasonic waves having been received by the sonic wave receiver 23. Further, the receiving circuit 24 includes a plurality of amplification circuits to stepwise amplify the output signal. The controller 100 acquires output signals output from both of a first-stage amplification circuit and a last-stage amplification circuit among the plurality of amplification circuits.

The paper detection section 30 includes the paper sensor 31. The paper sensor 31 is an optical sensor including, for example, a light emitting element and a light receiving element, and detects the presence or absence of the paper S by allowing the light emitting element to emit light rays toward the transport path 5, and allowing the light receiving element to receive reflected light rays of the emitted light rays.

The image reading section 40 is an image reading section for optically reading the paper S, and includes the light source 41, the lens array 42, the image sensor 43, and an A/D converter 44. The light source 41 includes, for example, a red LED, a green LED, and a blue LED, and emits light rays of one of these three colors while sequentially switching light rays of the three colors into the light rays of the one of the three colors. The lens array 42 is, for example, a rod lens array, and forms a continuous image by superimposing upright equal-magnification images formed by a plurality of lenses arranged in a direction intersecting with the transport direction of the paper S, that is, arranged in an X direction (see FIG. 1). The image sensor 43 is, for example, a CCD (Charge Coupled device) sensor or a CMOS (Complementary Metal Oxide Semiconductor) sensor, and includes a plurality of sensor chips arranged in the X direction. Each of the sensor chips includes a corresponding one of photoelectric conversion elements. The amount of light rays received by the photoelectric conversion elements is stored as electric charges, and the stored electric charges are output as an analog signal. The A/D converter 44 converts the analog signal having been output from the image sensor 43 into a digital signal.

The storage section 50 includes a threshold value storage region 51. As the storage section 50, there is used a DRAM (Dynamic Random Access Memory). The threshold value storage region 51 stores therein determination threshold values for use in making various determinations based on the results of the detections by the sonic wave detection section 20. In the present embodiment, three threshold values in descending order, that is, a threshold value V0, a threshold value V1, and a threshold value V2, are stored as the determination threshold values.

Here, the threshold value V0 and the threshold value V1 are threshold values compared with an output signal having been output from the first-stage amplification circuit among the plurality of amplification circuits included in the receiving circuit 24. Further, the threshold value V2 is a threshold values compared with an output signal having been output from the last-stage amplification circuit among the plurality of amplification circuits included in the receiving circuit 24. Note that the threshold value V1 is an example of "a first threshold value" in the present disclosure, and the threshold value V2 is an example of "a second threshold value" and "a threshold value" in the present disclosure.

Figure 3:
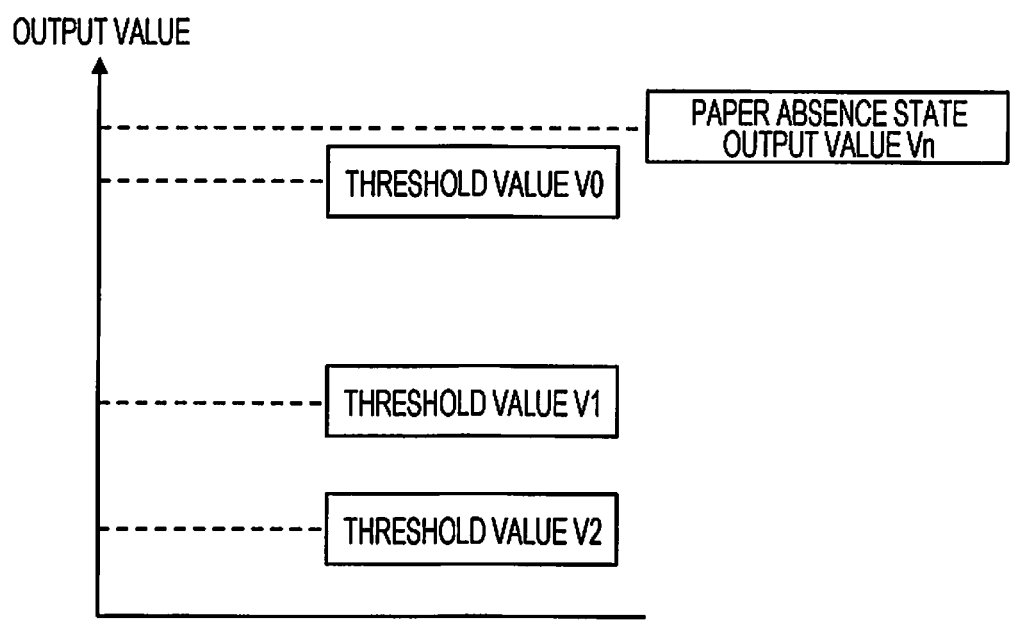
FIG. 3 is a diagram that describes determination threshold values.

FIG. 3 is a diagram that describes the determination threshold values. In FIG. 3, a vertical axis indicates the value of the output signal of the sonic wave detection section 20. Hereinafter, "the value of an output signal" will be referred to as "an output value". When an output value of the sonic wave detection section 20 when the paper S does not exist at a detection position of the sonic wave detection section 20 is denoted by "a paper absence state output value Vn", as shown in FIG. 1, the threshold value V0 is set to a value falling within a range approximately from 70% to 90% of the paper absence state output value Vn. Further, the threshold value V1 is set to a value falling within a range approximately from 40% to 60% of the paper absence state output value Vn. Further, the threshold value V2 is set to a value falling within a range approximately from 10% to 30% of the paper absence state output value Vn. Here, the percentages relative to the paper absence output value Vn with respect to the threshold value V0 and the threshold value V1 are values that are determined for each image reading apparatus 1, that is, for example, for each type of apparatus, based on what range of the thickness or the basic weight of the paper S the each image reading apparatus 1 is capable of supporting. In contrast, the threshold value V2 is a value that is set as a constant value regardless of what range of the thickness or the basic weight of the paper S the each image reading apparatus 1 is capable of supporting.

Here, the threshold value V0 is a threshold value for use in determining the presence of absence of the paper S. When an output value of the sonic wave detection section 20 is smaller than the threshold value V0, the controller 100 determines that the paper S exists at a detection position of the sonic wave detection section 20. Further, the threshold value V1 is a threshold value for use in determining whether or not the kind of paper S is multi-layered paper S1 (see FIG. 5). When the output value of the sonic wave detection section 20 is smaller than the threshold value V0 and is larger than the threshold value V1, the controller 100 determines that the kind of paper S is regular paper S2 (see FIG. 4). The multi-layered paper S1 is an example of "at least one sheet of paper of a first kind" in the present disclosure, and the regular paper S2 is an example of "at least one sheet of paper of a second kind" in the present disclosure.

Further, the threshold value V2 is a threshold value for use in determining whether or not the multi-feeding of the paper S is occurring. When a period of time during which the output value of the sonic wave detection section 20 is smaller or equal to the threshold value V2 continues during a period of time longer than or equal to a threshold period of time, the controller 100 determines that there is a possibility of the occurrence of multi-feeding. Note that the sonic wave detection section 20 detects the occurrence of multi-feeding at intervals of a predetermined cycle. Thus, at a time point when an output signal having a value smaller than or equal to the threshold value V2 has been output from the sonic wave detection section 20 predetermined times, the controller 100 determines that there is a possibility of the occurrence of multi-feeding. In this case, the number of the output times of the output signal corresponds to a period of time during which the output signal having a value smaller than or equal to the threshold value V2 has been output. That is, the above expression "an output signal having a value smaller than or equal to the threshold value V2 has been output at predetermined times" means that "an output signal having a value smaller than or equal to the threshold value V2 has been output during the threshold period of time". Further, the expression "has been output at predetermined times" means that it is not necessary to be successively output at predetermined times, and is a concept that also involves a case in which the total number of output signals having a value smaller than or equal to the threshold value V2 and having been output for the same paper S reaches the predetermined times.

Note that an output signal output from the sonic wave detection section 20 and being larger than the threshold value V2 and smaller than or equal to the threshold value V1 is an example of "a first output signal" in the present disclosure. Further, an output signal output from the sonic wave detection section 20 and being smaller than or equal to the threshold value V2 is an example of "a second output signal" in the present disclosure. Moreover, an output signal output from the sonic wave detection section 20 and being larger than the threshold value V1 and smaller than or equal to the threshold value V0 is an example of "a third output signal" in the present disclosure.

Here, the multi-layered paper S1 means the paper S having a multi-layered structure in which a plurality of layers is included, such as the structure of photo paper. For the paper S having such a multi-layered structure, in the inside of the multi-layered structure, partial layers may be exfoliated by rough treatments, age-related deterioration, or the like, and this exfoliation may cause hollow portions. For the multi-layered paper S1 in which such hollow portions have occurred, the ultrasonic waves having been transmitted from the sonic wave transmitter 21 may be attenuated by the hollow portions, and an output signal having a value smaller than or equal to the threshold value V2 may be output although the paper S is one sheet of paper. For this reason, when an output signal for which the output value of the sonic wave detection section 20 is smaller than or equal to the threshold value V1 has been output, the image reading apparatus 1 of the present embodiment reduces an erroneous determination about multi-feeding by performing particular determination processing. Meanwhile, the regular paper S2 means the paper S having a paper thickness and a basic weight at least one of which is smaller than a corresponding one of those of the multi-layered paper S1. In other words, the regular paper S2 means the paper S that allows the ultrasonic waves to be more easily passed through than the multi-layered paper S1, that is, the paper S having a smaller attenuation ratio for the ultrasonic waves than the multi-layered paper S1.

Let us return to the description of FIG. 2. The image processing section 60 includes a processor that performs image processing on scan data resulting from the reading by the image reading section 40 and generates scan images. As the processor, for example, an ASIC (Application Specific Integrated Circuit) that is dedicated to the image processing is used. Naturally, a general-purpose CPU (Central Processing Unit) may be used, or there may be employed a configuration in which the CPU and the ASIC cooperate with each other. The image processing section 60 performs various kinds of processing, such as shading correction processing, gamma correction processing, line-to-line correction processing, skew correction processing, and the like.

The operation section 70 is for use in various kinds of settings and instructions made by a user. Further, the display section 80 displays various kinds of information. For example, when having determined that there is a possibility of the occurrence of multi-feeding, the controller 100 allows the display section 80 to display a message for notifying that there is a possibility of the occurrence of multi-feeding. As the operation section 70 and the display section 80, for example, a display with a touch panel is used. Naturally, the operation section 70 and the display section 80 may be individually provided.

The output section 90 outputs, to a host apparatus 200, scan images resulting from the image processing by the image processing section 60, and various kinds of control signals. As the host apparatus 200, for example, a PC (Personal Computer) is used. When the controller 100 has determined that there is a possibility of the occurrence of multi-feeding, the output section 90 outputs, to the host apparatus 200, an image file including the above scan images and multi-feeding occurrence determination information indicating that there is a possibility of the occurrence of multi-feeding. Further, when the controller 100 has determined that there is no possibility of the occurrence of multi-feeding, the output section 90 outputs, to the host apparatus 200, an image file including the above scan images and multi-feeding non-occurrence determination information indicating that there is no possibility of the occurrence of multi-feeding. The above image file corresponds to an image signal.

In this case, the multi-feeding occurrence determination information or the multi-feeding non-occurrence determination information may be added to the scan images as a header or a flag. Further, the multi-feeding occurrence determination information or the multi-feeding non-occurrence determination information may be added to the scan images as an attachment file attached to a file of the scan images. In this way, the file of the scan images and the file including the multi-feeding occurrence determination information or the multi-feeding non-occurrence determination information may be collectively regarded as the image signal. Moreover, when the controller 100 has determined that there is no possibility of the occurrence of multi-feeding, the output section 90 may not add the multi-feeding non-occurrence determination information to the scan images, and may output, to the host apparatus 200, an image file not including the multi-feeding non-occurrence determination information, that is, an image file including only the scan images.

The controller 100 is coupled to the above-described individual sections, and controls the individual sections. The controller 100 includes, for example, a processor (for example, a CPU, an ASIC, or a CPU and an ASIC that cooperate with each other), a ROM (Read Only Memory) module, and a RAM (Random Access Memory) module.

Under the above configuration, at the time of power-on of the image reading apparatus 1, the controller 100 first acquires an output value of the sonic wave detection section 20 immediately after the power-on, that is, the paper absence state output value Vn. Further, based on the acquired paper absence state output value Vn, the controller 100 calculates the threshold value V0, the threshold value V1, and the threshold value V2 using a predetermined algorithm, and stores the calculated threshold values V0, V1, and V2 into the threshold value storage region 51. Thereafter, the controller 100 starts the transport and the reading of the paper S based on a reading start instruction from a user. Further, at the time when a predetermined period of time T1 has elapsed from the detection of the anterior edge of the paper S by the paper sensor 31, the controller 100 starts determinations based on output signals having been output from the sonic wave detection section 20.

Upon start of the detections by the sonic wave detection section 20, the controller 100 determines whether or not the paper S, which is a target of the reading, is the multi-layered paper S1 based on an output value of the sonic wave detection section 20. In a case in which the controller 100 has determined that the paper S is the multi-layered paper S1, even when having determined that there is a possibility of the occurrence of multi-feeding based on the output value of the sonic wave detection section 20, the controller 100 allows the transport and the reading of the paper S to be continued. Meanwhile, in a case in which the controller 100 has determined that the paper S is the regular paper S2, when having determined that there is a possibility of the occurrence of multi-feeding based on the output value of the sonic wave detection section 20, the controller 100 interrupts the transport and the reading of the paper S, and displays an error message on the display section 80. In this way, when having determined that the paper S is the multi-layered paper S1, the controller 100 allows the transport and the reading of the paper S to be continued in order to prevent the transport and the reading of the paper S from being interrupted by an erroneous determination about multi-feeding. Further, when the controller 100 has determined that the paper S is the regular paper S2, the possibility of the erroneous determination about the multi-feeding is low, and thus, the controller 100 interrupts the transport and the reading of the paper S in order to prevent the breakage of the paper S, or the like caused by the multi-feeding.

Further, when having determined that there is a possibility of the occurrence of multi-feeding, after the completion of the reading of the paper S, the controller 100 displays, on the display section 80, a message indicating that there is a possibility of the occurrence of multi-feeding, and concurrently therewith, outputs, to the host apparatus 200, an image file including the scan images and the multi-feeding occurrence determination information. In contrast, when the controller 100 has not determined that there is a possibility of the occurrence of multi-feeding, that is, when the reading of the paper S has normally completed, the controller 100 outputs, to the host apparatus 200, an image file including the scan images and the multi-feeding non-occurrence determination information.

Figure 4:
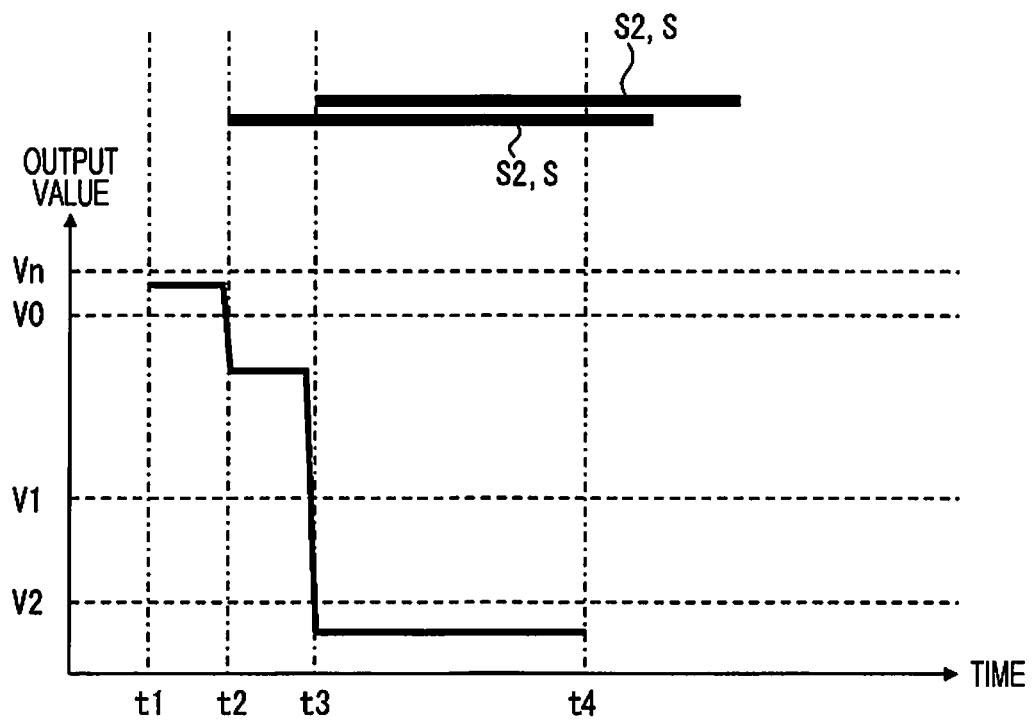
FIG. 4 is a diagram illustrating an example of the results of detections by a sonic wave detection section when regular paper is used.

Here, the results of detections by the sonic wave detection section 20 will be described using specific examples. FIG. 4 is a diagram illustrating an example of the results of detections by the sonic wave detection section 20 when the regular paper S2 is used. In FIG. 4, the vertical axis indicates an output value of the sonic wave detection section 20, and the horizontal axis indicates time. A reference sign t1 denotes a time point of the start of the detections by the sonic wave detection section 20. When an output value of the sonic wave detection section 20 is denoted by Vo, during a period between the reference sign t1 and a reference sign t2, a "paper absence" state is determined because Vo>V0. Further, during a period between the reference sign t2 and a reference sign t3, it is determined that the paper S is the regular paper S2 because V1<Vo≤V0. Further, during a period after the reference sign t3, it is determined that there is a possibility of the occurrence of multi-feeding because Vo≤V2.

In the example of FIG. 4, the paper S is determined to be the regular paper S2 during the period between the reference sign t2 and the reference sign t3, and thus, during the period after the reference sign t3, the transport and the reading of the paper S are interrupted at a time point when an output signal satisfying Vo≤V2 has been output predetermined times. A reference sign t4 denotes the time point when the output signal satisfying Vo≤V2 has reached the predetermined times, that is, the time point when the transport and the reading of the paper S have been interrupted. At this time point, the controller 100 determines that a multi-feeding error has occurred, and interrupts the detections by the sonic wave detection section 20, concurrently with making an error indication on the display section 80.

Figure 5:
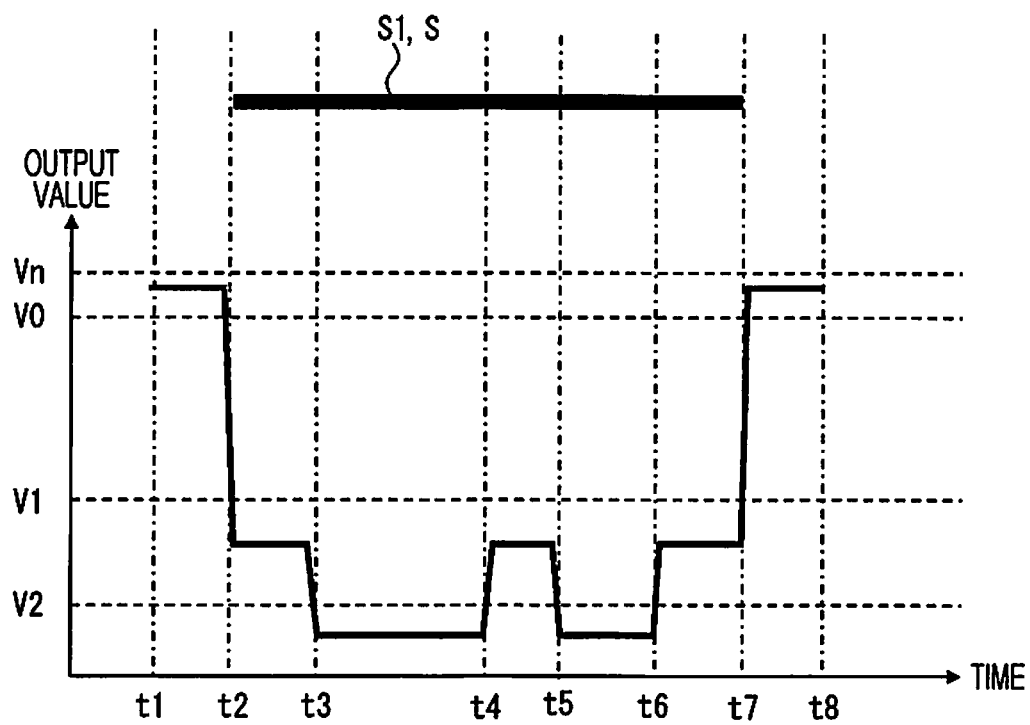
FIG. 5 is a diagram illustrating an example of the results of detections by a sonic wave detection section when multi-layered paper is used.

FIG. 5 is a diagram illustrating an example of the results of the detections by the sonic wave detection section 20 when the multi-layered paper S1 is used. A reference sign t1 denotes a time point of the start of the detections by the sonic wave detection section 20. When an output value of the sonic wave detection section 20 is denoted by Vo, during a period between the reference sign t1 and a reference sign t2, a "paper absence" state is determined because Vo>V0. Further, during a period between the reference sign t2 and a reference sign t3, it is determined that the paper S is the multi-layered paper S1 because V2<Vo≤V1. Further, during a period between the reference sign t3 and a reference sign t4, it is determined that there is a possibility of the occurrence of multi-feeding because Vo≤V2.

In the example of FIG. 5, the paper S is determined to be the multi-layered paper S1 during the period between the reference sign t2 and the reference sign t3, and thus, during a period after the reference sign t3, it is not determined that a multi-feeding error has occurred even when an output signal satisfying Vo≤V2 has been output predetermined times, and the transport and the reading of the paper S are continued. Thereafter, the output values of the sonic wave detection section 20 fluctuate such as: V2<Vo≤V1 during a period between the reference sign t4 and a reference sign t5; Vo≤V2 during a period between the reference sign t5 and a reference sign t6; and V2<Vo≤V1 during a period between the reference sign t6 and a reference sign t7. Such output values occur when hollow portions exist in the multi-layered paper S1. In the example of FIG. 5, it is speculated that the hollow portions of the multi-layered paper S1 have been located at the detection position of the sonic wave detection section 20 during the periods when Vo≤V2 is satisfied, that is, the period between the reference sign t3 and the reference sign t4, and the period between the reference sign t5 and the reference sign t6. Thereafter, during a period between the reference sign t7 and a reference sign t8, Vo>V0 is satisfied, and thus, the "paper absence" state is determined. The reference sign t8 denotes a time point of the completion of the detections by the sonic wave detection section 20. The sonic wave detection section 20 completes the detections at a time point when, in the results of the detections by the paper sensor 31, a "paper presence" state has changed to the "paper absence" state.

Figure 6:
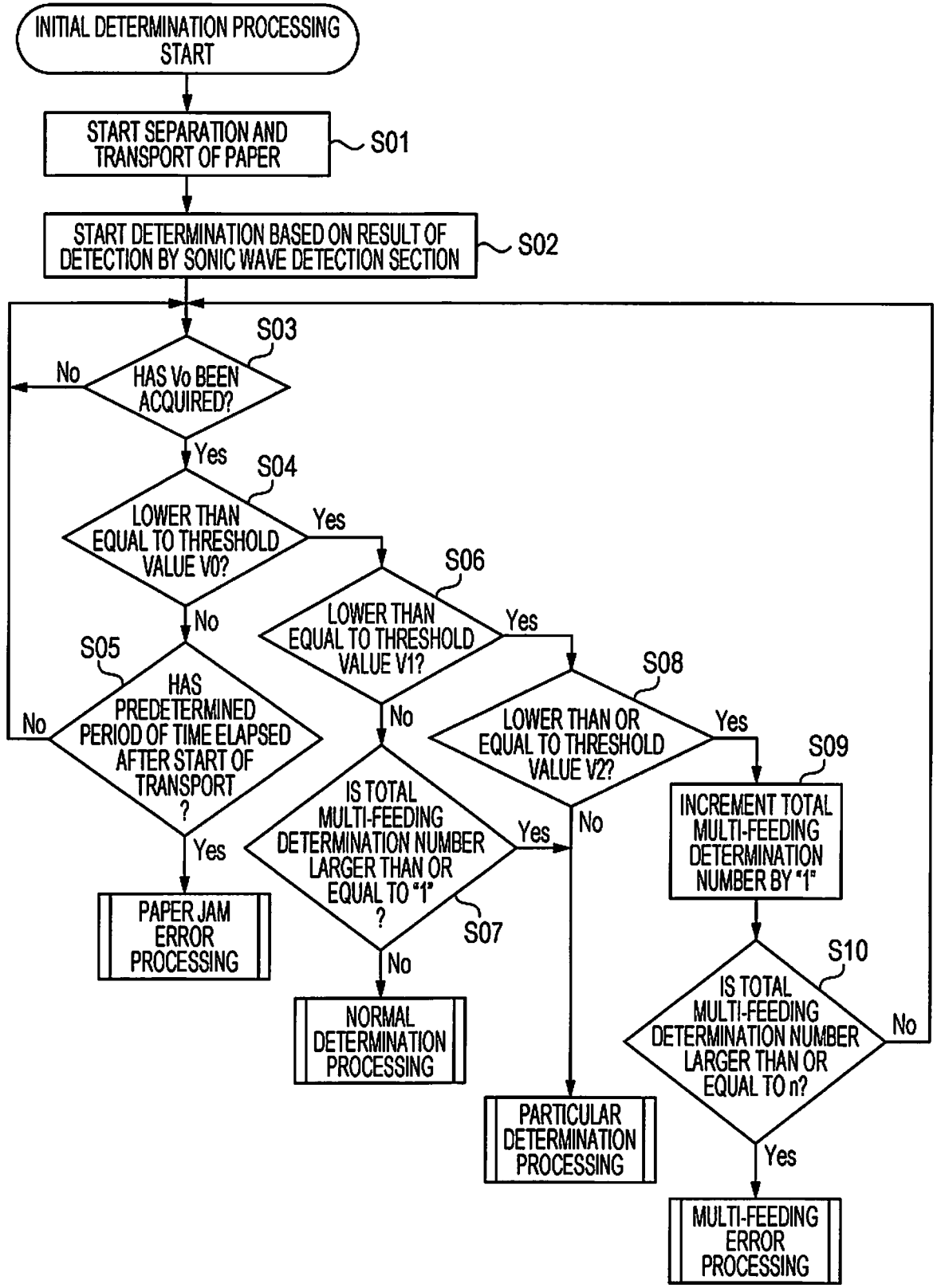
FIG. 6 is a flowchart illustrating the flow of an initial determination processing according to a first embodiment.

Next, a series of processing indicating an image file generation method for the image reading apparatus 1 will be described with reference to the flowcharts of FIGS. 6 to 12. FIG. 6 is a flowchart illustrating the flow of an initial determination processing that is a portion of the series of processing. Upon start of the initial determination processing based on a reading start instruction from a user, the image reading apparatus 1 first starts the separation and transport of the paper S by the pair of separation rollers 11 (S01). After an elapse of a predetermined time T1 from a time point when, along with the transport of the paper S, the anterior edge of the paper S has been detected by the paper sensor 31, the image reading apparatus 1 starts determinations based on the results of the detections by the sonic wave detection section 20 (S02). The image reading apparatus 1 determines whether or not an output value Vo of the sonic wave detection section 20 has been acquired (S03), and when the result of the determination is that the output value Vo has not yet been acquired (S03: No), the image reading apparatus 1 returns the process flow to S03; while in contrast, when the result of the determination is that the output value Vo has been acquired (S03: Yes), the image reading apparatus 1 causes the process flow to proceed to S04. Here, although not illustrated, as an additional process in S03, when the above determination that the output value Vo has not yet been acquired has been successively made more than or equal to predetermined times, this event shows that, because of jam or the like, the paper S does not exist at a position where the paper S should exist, and thus, the image reading apparatus 1 makes an error notification. This additional process is similarly applied to S12 of FIG. 7 and S22 of FIG. 8, which will be described later.

Upon acquisition of the output value Vo of the sonic wave detection section 20, the image reading apparatus 1 determines whether or not Vo≤V0 is satisfied (S04), and when the result of the determination is that Vo≤V0 is not satisfied (S04: No), the image reading apparatus determines whether or not a predetermined time T2 has elapsed after the start of the transport (S05). Further, when the result of the determination is that the predetermined time T2 has not yet elapsed after the start of the transport (S05: No), the image reading apparatus 1 returns the process flow to S03; while in contrast, when the result of the determination is that the predetermination time T2 has elapsed after the start of the transport (S05: Yes), the image reading apparatus 1 performs paper jam processing (see FIG. 9).

When the result of the determination in S04 is that Vo≤V0 is satisfied (S04: Yes), the image reading apparatus 1 determines whether or not Vo≤V1 is satisfied (S06). When the result of the determination is that Vo≤V1 is not satisfied (S06: No), the image reading apparatus 1 determines whether or not the number of determinations that there is a possibility of the occurrence of multi-feeding, that is, the number of determinations that Vo≤V2 is satisfied, is larger than or equal to "1" (S07). Here, "the number of determinations that there is a possibility of the occurrence of multi-feeding" will be hereinafter referred to as "a total multi-feeding determination number". When the result of the determination is that the total multi-feeding determination number is not larger than or equal to "1" (S07: No), the image reading apparatus 1 performs normal determination processing (see FIG. 7); while in contrast, when the result of the determination is that the total multi-feeding determination number is larger than or equal to "1" (S07: Yes), the image reading apparatus 1 performs particular determination processing (see FIG. 8). In this way, when the result of the determination is that Vo≤V1 is not satisfied (S06: No), that is, even when it has been determined that the paper S is the regular paper S2, the image reading apparatus 1 performs the particular determination processing because, for the paper S for which the occurrence of multi-feeding has ever been determined, there is a possibility that one or more sticky notes, one or more stickers, and/or the like may be stuck on the relevant paper S.

When the result of the determination in S06 is that Vo≤V1 is satisfied (S06: Yes), the image reading apparatus 1 determines whether or not Vo≤V2 is satisfied (S08). When the result of the determination is that Vo≤V2 is not satisfied (S08: No), the image reading apparatus performs the particular determination processing. Further, when the result of the determination is that Vo≤V2 is satisfied (S08: Yes), the image reading apparatus increments the total multi-feeding determination number by "1" (S09), and determines whether or not the total multi-feeding determination number is larger than or equal to n (S10). When the result of the determination is that the total multi-feeding determination number is larger than or equal to n (S10: Yes), the image reading apparatus 1 performs multi-feeding error processing (see FIG. 10); while in contrast, when the result of the determination is that the total multi-feeding determination number is not larger than or equal to n (S10: No), the image reading apparatus 1 returns the process flow to S03.

Figure 7:
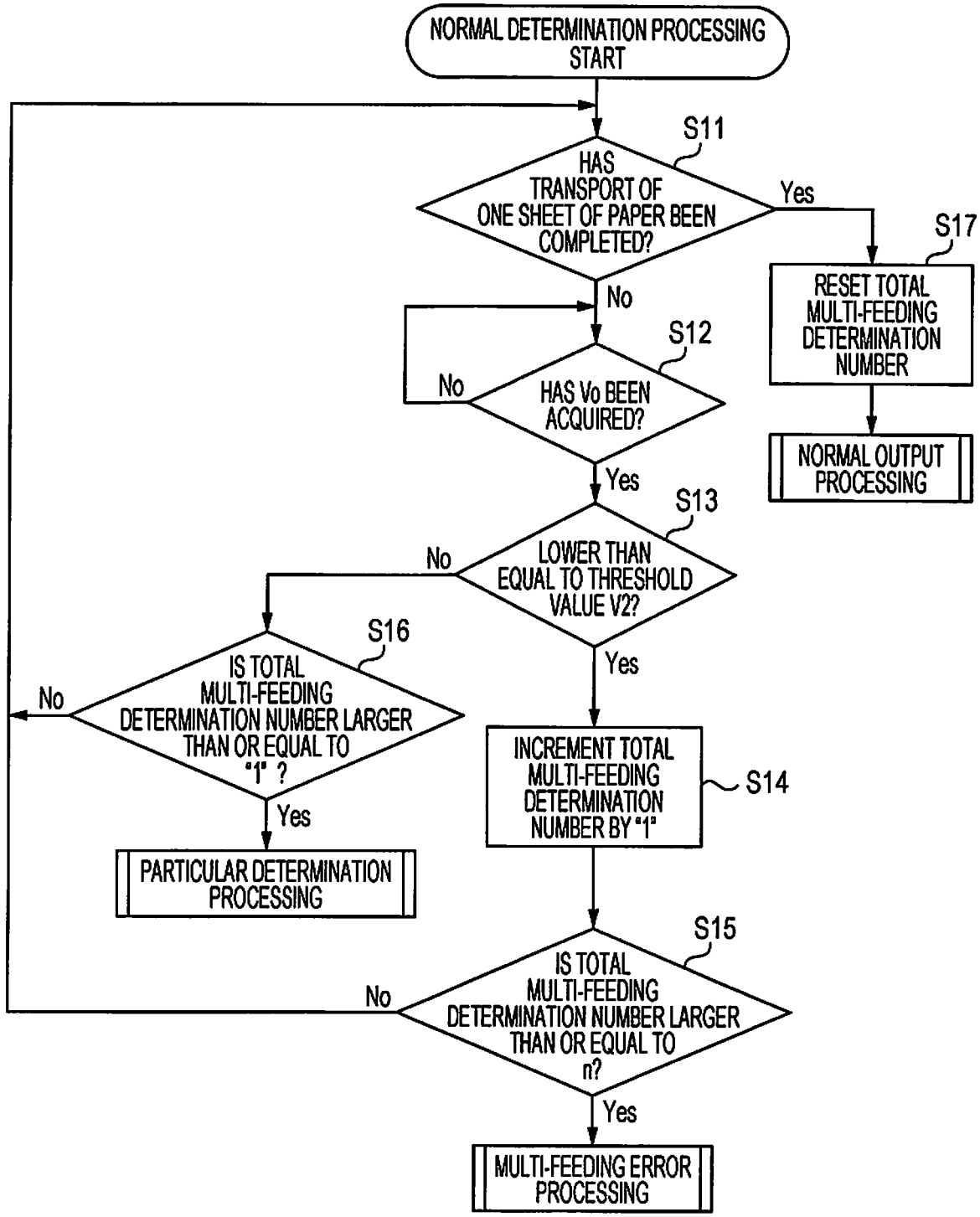
FIG. 7 is a flowchart illustrating the flow of a normal determination processing.

FIG. 7 is a flowchart illustrating the flow of the normal determination processing. Upon start of the normal determination processing, the image reading apparatus 1 determines whether or not the transport of one sheet of paper has been completed (S11). The image reading apparatus 1 determines whether or not the transport of the one sheet of paper has been completed by determining whether or not the "paper presence" state has changed to the "paper absence" state" in the results of the determinations by the paper sensor 31. Alternatively, when a user has already set a transport-direction length of the paper S, the image reading apparatus 1 may determine whether or not the transport of the one sheet of paper has been completed by determining whether or not transport by a distance equivalent to the length has been completed.

When the result of the determination is that the transport of the one sheet of paper has not yet been completed (S11: No), the image reading apparatus 1 determines whether or not an output value Vo of the sonic wave detection section 20 has been acquired (S12). When the result of the determination is that the output value Vo has not yet been acquired (S12: No), the image reading apparatus 1 returns the process flow to S12; while in contrast, when the result of the determination is that the output value Vo has been acquired (S12: Yes), the image reading apparatus determines whether or not Vo≤V2 is satisfied (S13). When the result of the determination is that Vo≤V2 is satisfied (S13: Yes), the image reading apparatus increments the total multi-feeding determination number by "1" (S14), and determines whether or not the total multi-feeding determination number is larger than or equal to n (S15). When the result of the determination is that the total multi-feeding determination number is larger than or equal to n (S15: Yes), the image reading apparatus 1 performs the multi-feeding error processing; while in contrast, when the result of the determination is that the total multi-feeding determination number is not larger than or equal to n (S15: No), the image reading apparatus 1 returns the process flow to return to S11. Note that the above case in which the result of the determination is that the total multi-feeding determination number is larger than or equal to n (S15: Yes) is an example of "a second case" in the present disclosure.

In contrast, when the result of the determination in S13 is that Vo≤V2 is not satisfied (S13: No), the image reading apparatus 1 determines whether or not the total multi-feeding determination number is larger than or equal to "1" (S16). When the result of the determination is that the total multi-feeding determination number is larger than or equal to "1" (S16: Yes), the image reading apparatus 1 performs the particular determination processing; while in contrast, when the result of the determination is that the total multi-feeding determination number is not larger than or equal to "1" (S16: No), the image reading apparatus 1 returns the process flow to S11. The reason why the particular determination processing is performed when the result of the determination in S16 is that the total multi-feeding determination number is larger than or equal to "1" is that, similarly to the case of S07: Yes in FIG. 6, the paper S on which one or more sticky notes, one or more stickers, or the like are stuck is taken into consideration. Further, when the result of the determination in S11 is that the transport of the one sheet of paper has been completed (S11: Yes), the image reading apparatus 1 resets the total multi-feeding determination number (S17), and performs normal output processing (see FIG. 11).

Figure 8:
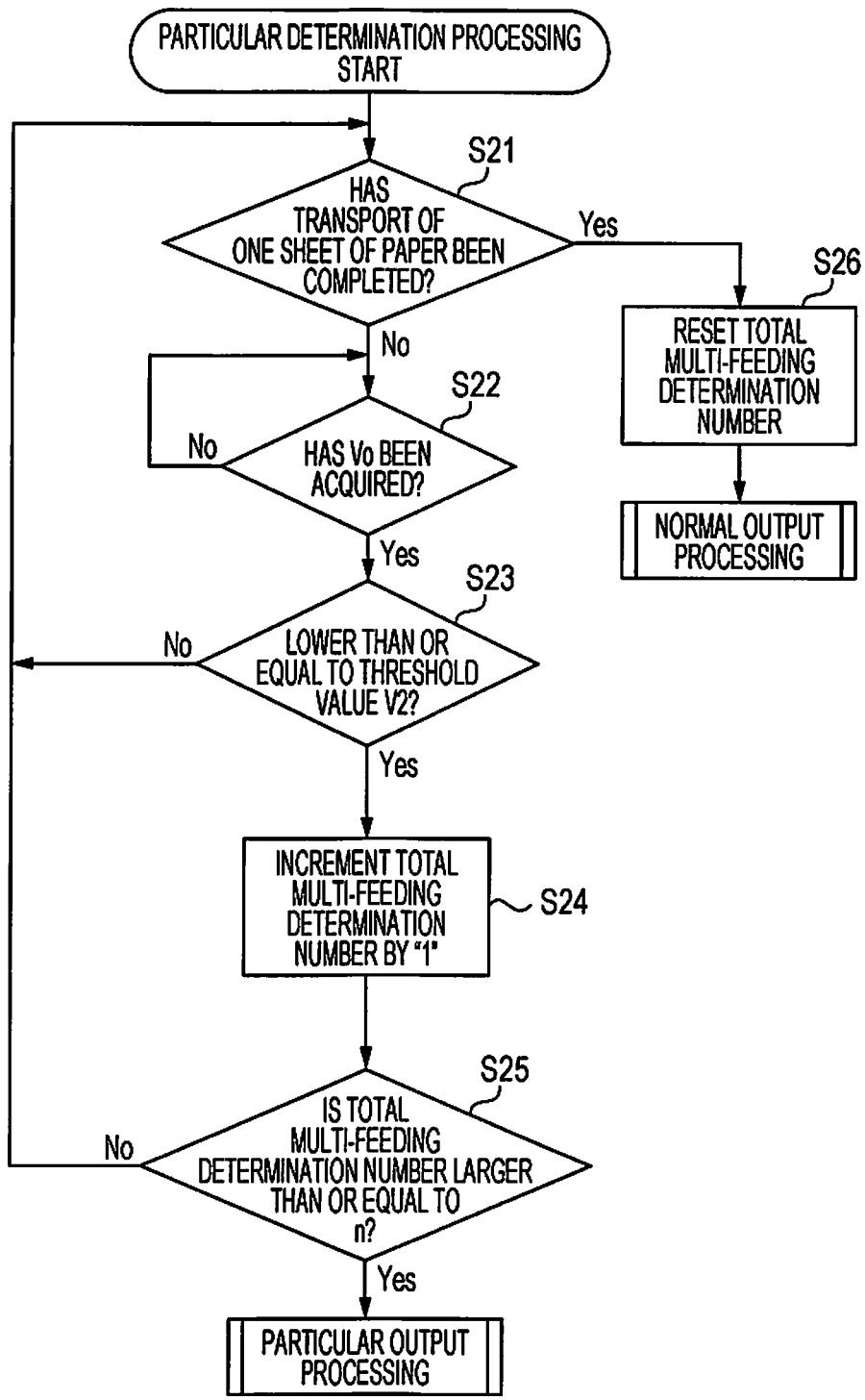
FIG. 8 is a flowchart illustrating the flow of a particular determination processing.

FIG. 8 is a flowchart illustrating the flow of the particular determination processing. Upon start of the particular determination processing, the image reading apparatus 1 determines whether or not the transport of one sheet of paper has been completed (S21), and when the result of the determination is that the transport of the one sheet of paper has not yet been completed (S21: No), the image reading apparatus 1 determines whether or not an output value Vo of the sonic wave detection section 20 has been acquired (S22). When the result of the determination is that the output value Vo has not yet been acquired (S22: No), the image reading apparatus 1 returns the process flow to S22; while in contrast, when the result of the determination is that the output value Vo has been acquired (S22: Yes), the image reading apparatus 1 determines whether or not Vo≤V2 is satisfied (S23). When the result of the determination is that Vo≤V2 is satisfied (S23: Yes), the image reading apparatus increments the total multi-feeding determination number by "1" (S24), and determines whether or not the total multi-feeding determination number is larger than or equal to n (S25). When the result of the determination is that the total multi-feeding determination number is larger than or equal to n (S25: Yes), the image reading apparatus 1 performs particular output processing (see FIG. 12); while in contrast, when the result of the determination is that the total multi-feeding determination number is not larger than or equal to n (S25: No), the image reading apparatus 1 returns the process flow to S21. Note that the above case in which the result of the determination is that the total multi-feeding determination number is larger than or equal to n (S25: Yes) is an example of "a first case" in the present disclosure.

In contrast, when the result of the determination in S23 is that Vo≤V2 is not satisfied (S23: No), the image reading apparatus 1 returns the process flow to S21. Further, when the result of the determination in S21 is that the transport of the one sheet of paper has been completed (S21: Yes), the image reading apparatus 1 resets the total multi-feeding determination number (S26), and performs the normal output processing.

Figure 9:
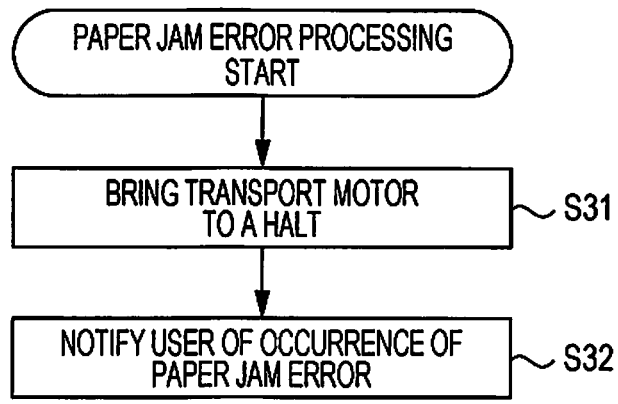
FIG. 9 is a flowchart illustrating the flow of a paper jam error processing.

FIG. 9 is a flowchart illustrating the flow of the paper jam error processing. Upon start of the paper jam error processing, the image reading apparatus 1 brings the transport motor 14 to a halt to interrupt the transport and the reading of the paper S (S31). Further, the image reading apparatus 1 notifies a user of the occurrence of a paper jam error by displaying a message indicating the paper jam error on the display section 80 (S32).

Figure 10:
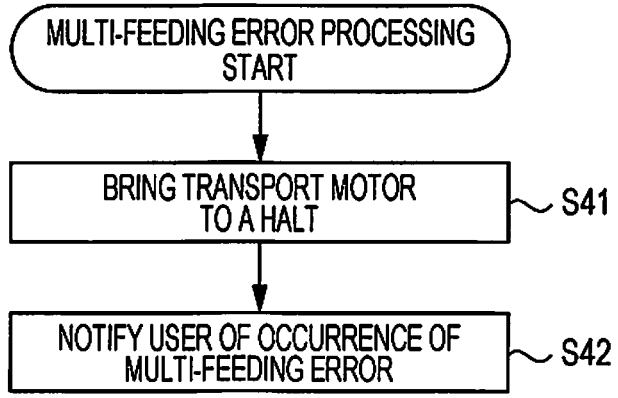
FIG. 10 is a flowchart illustrating the flow of a multi-feeding error processing.

FIG. 10 is a flowchart illustrating the flow of the multi-feeding error processing. Upon start of the multi-feeding error processing, the image reading apparatus 1 brings the transport motor 14 to a halt to interrupt the transport and the reading of the paper S (S41). Further, the image reading apparatus 1 notifies a user of the occurrence of a multi-feeding error by displaying a message indicating the multi-feeding error on the display section 80 (S42).

Figure 11:
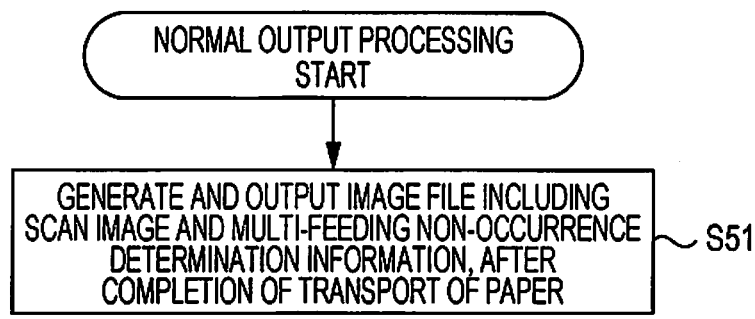
FIG. 11 is a flowchart illustrating the flow of a normal output processing.

FIG. 11 is a flowchart illustrating the flow of the normal output processing. Upon start of the normal output processing, the image reading apparatus 1 generates an image file including the scan images and the multi-feeding non-occurrence determination information, and outputs the generated image file to the host apparatus 200 (S51). Note that S51 is an example of "a generation process" in the present disclosure.

Figure 12:
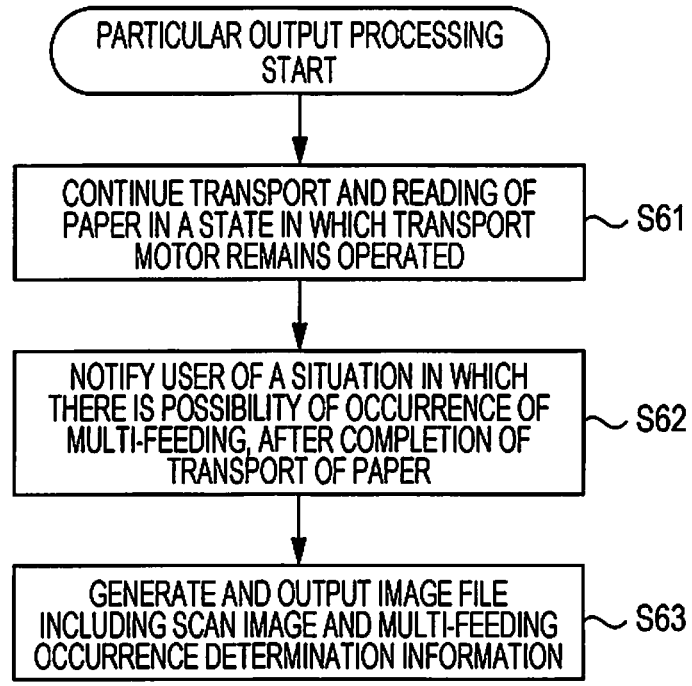
FIG. 12 is a flowchart illustrating the flow of a particular output processing.

FIG. 12 is a flowchart illustrating the flow of the particular output processing. Upon start of the particular output processing, the image reading apparatus 1 continues the transport and the reading of the paper S in a state in which the transport motor 14 remains operated (S61). Further, after the completion of the transport of the paper S, the image reading apparatus 1 notifies a user of a situation in which there is a possibility of the occurrence of multi-feeding by displaying, on the display section 80, a message indicating that there is a possibility of the occurrence of multi-feeding (S62). Further, the image reading apparatus 1 generates an image file including the scan images and the multi-feeding occurrence determination information, and outputs the generated image file to the host apparatus 200 (S63). Note that S63 is an example of the "generation process" in the present disclosure.

As described above, during the transport of the paper S, when $V2<Vo\leq V1$ and $Vo\leq V2$ are output for the same paper S, the image reading apparatus 1 of the present embodiment continues the transport and the reading of the paper S; while, during the transport of the paper S, when $V1<Vo\leq V0$ and $Vo\leq V2$ are output for the same paper S, the image reading apparatus 1 determines that multi-feeding error is occurring, and interrupts the transport and the reading of the paper S. According to this configuration, in the case of the paper S for which, like the multi-layered paper S1, the probability of an erroneous determination about multi-feeding is high, the scan images can be generated even when a determination that there is a possibility of the occurrence of multi-feeding has been made, and thus, user's labor of performing a scanning operation again to restart scan operation having been interrupted by an erroneous determination can be reduced. Meanwhile, in the case of the paper S for which, like the regular paper S2, the probability of the erroneous determination about multi-feeding is low, the scan operation is interrupted when the determination that there is a possibility of the occurrence of multi-feeding has been made, and thus, the breakage of the paper S and the increase of the load on the transport motor 14 due to the multi-feeding can be reduced.

Further, the image reading apparatus 1 determines that there is a possibility of the occurrence of multi-feeding when the total multi-feeding determination number has reached a number larger than or equal to n, and thus, is capable of determining the occurrence of multi-feeding with accuracy. Further, the image reading apparatus 1 is configured to count up the total multi-feeding determination number with respect to determinations having been made on one sheet of paper S, and thus, is capable of determining the occurrence of multi-feeding with certainty even when an output signal satisfying $Vo>V2$ is temporarily output due to some kind of cause.

Further, in a case in which the image reading apparatus 1 has determined that the paper S is the regular paper S2, when having determined that the total multi-feeding determination number is larger than or equal to "1" (the case of S07: Yes in FIG. 6 and the case of S16: Yes in FIG. 7), the image reading apparatus 1 also performs the particular determination processing, and thus, is capable of generating the scan images without making an erroneous determination that multi-feeding is occurring, even when, for example, one or more sticky notes and/or one or more stickers are stuck on the regular paper S2.

Further, when the result of a determination having made in the particular determination processing is that the total multi-feeding determination number is larger than or equal to n, the image reading apparatus 1 outputs the image file in which the multi-feeding occurrence determination information is added to the scan images, and thus, a user who operates the host apparatus 200 is able to recognize that the scan images are images having a possibility of the occurrence of multi-feeding. Further, based on the multi-feeding occurrence determination information, the narrowing down and/or the rearranging of the scan images can be executed on the side of the host apparatus 200.

Second Embodiment

Next, a second embodiment of the present disclosure will be described. In the first embodiment, the kind of paper S is determined based on the results of determinations by the sonic wave detection section 20, but, in the present embodiment, the kind of paper S is determined based on a setting by a user. Hereinafter, description will be made focusing on points different from the first embodiment. Note that, in the present embodiment, the same constitutional portions as the constitutional portions of the first embodiment will be denoted by the same reference signs as those of the constitutional portions of the first embodiment, and detailed descriptions thereof will be omitted. Further, modification examples applied to the same constitutional portions as those of the first embodiment are also similarly applied in the present embodiment. This is also the same for a case in which the kind of paper S is determined using any one of methods other than the setting by a user and the results of the determinations by the sonic wave detection section 20.

In the image reading apparatus 1 of the present embodiment, the configuration of its control system is the same as the configuration of the control system of the first embodiment, which is illustrated in FIG. 2, and it is enough just to store only two kinds of threshold values, namely, the threshold values V0 and V2, in the threshold value storage region 51, as the determination threshold values. Further, in the present embodiment, a user sets the kind of paper S using the operation section 70. The kind of paper S may not be set using such a classification into the multi-layered paper S1 and the regular paper S2, but may be set using, for example, a classification into "a postcard", "a business card", "photo paper", and the like.

The controller 100 acquires the kind of paper S, which has been set through the operation section 70, and determines whether or not the paper S, which is a target of reading, is the multi-layered paper S1. For example, when the "postcard" and the "business card" are set as the kinds of the paper S, the controller 100 determines that the kind of paper S is not the multi-layered paper S1, and when the "photo paper" is set, the controller 100 determines that the kind of paper S is the multi-layered paper S1. Note that the controller 100 is an example of an "acquisition section" in the present disclosure, and a process in which the controller 100 acquires the kind of paper S is an example of "an acquisition process" in the present disclosure.

Figure 13:
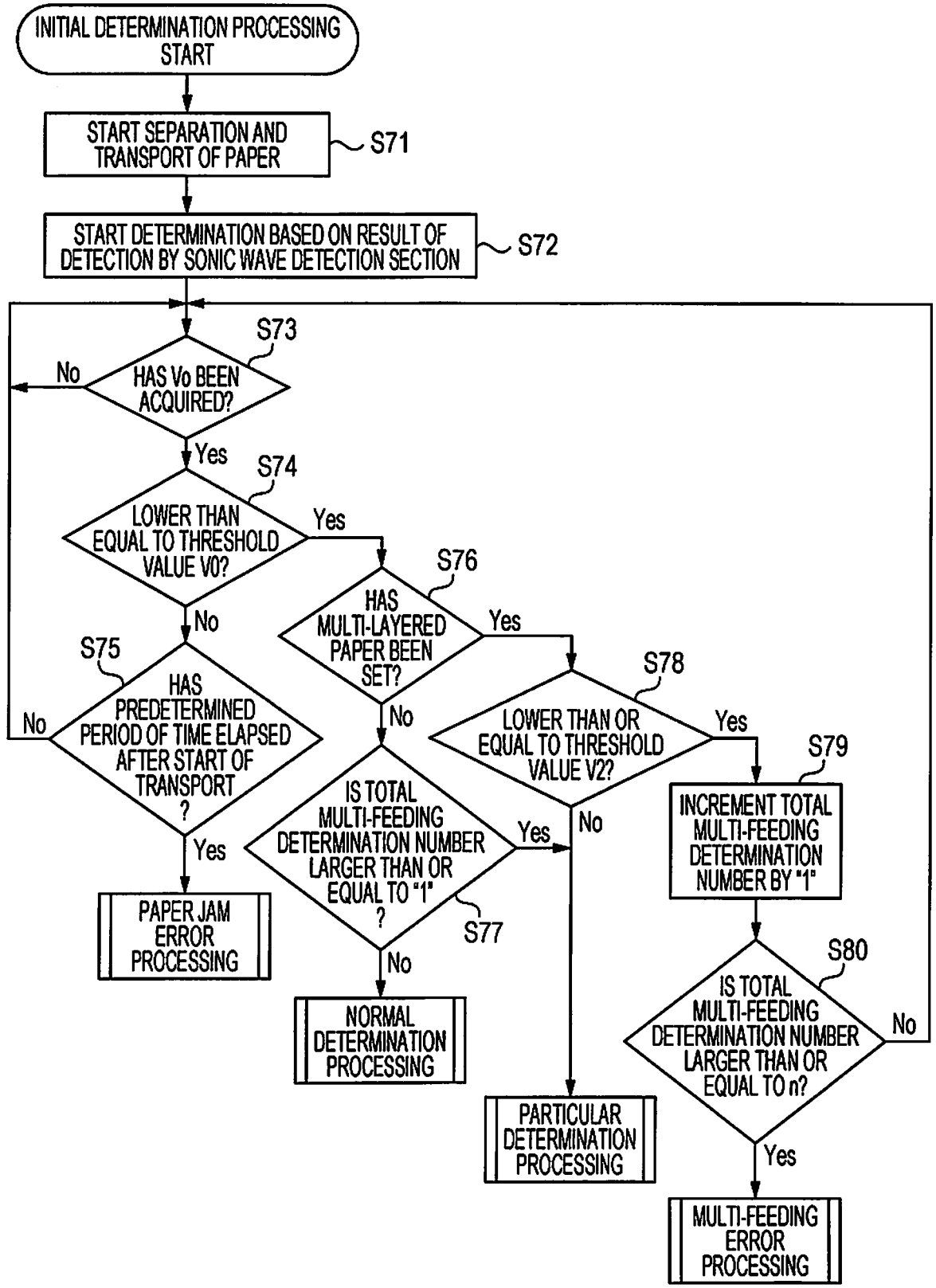
FIG. 13 is a flowchart illustrating the flow of an initial determination processing according to a second embodiment.

FIG. 13 is a flowchart illustrating the flow of an initial determination processing according to the second embodiment. Here, S71 to S75 are the same as S01 to S05 illustrated in FIG. 6. When the result of a determination in S74 is that an output value Vo of the sonic wave detection section 20 satisfies $Vo\leq V0$ (S74: Yes), the image reading apparatus 1 determines whether or not the multi-layered paper S1 has been set (S76). When the result of the determination is that the multi-layered paper S1 has not been set (S76: No), the image reading apparatus 1 determines whether or not the total multi-feeding determination number is larger than or equal to "1" (S77). When the result of the determination is that the total multi-feeding determination number is not larger than or equal to "1" (S77: No), the image reading apparatus 1 performs the normal determination processing (see FIG. 7); while in contrast, when the result of the determination is that the total multi-feeding determination number is larger than or equal to "1" (S77: Yes), the image reading apparatus 1 performs the particular determination processing (see FIG. 8).

Further, when the result of the determination in S76 is that the multi-layered paper S1 has been set (S76: Yes), the image reading apparatus 1 determines whether or not Vo≤V2 is satisfied (S78), and when the result of this determination is that Vo≤V2 is not satisfied (S78: No), the image reading apparatus 1 performs the particular determination processing. Here, S78 to S80 are the same as S08 to S10 illustrated in FIG. 6. Further, the other kinds of processing including the normal determination processing and the particular determination processing (see FIGS. 7 to 12) are the same as those of the first embodiment, and thus, descriptions thereof will be omitted.

As described above, the image reading apparatus 1 of the present embodiment determines whether or not the paper S is the multi-layered paper S1 based on the setting by a user, and thus, is capable of determining the kind of paper S with accuracy. With this configuration, therefore, user's labor of restarting scan operation having been interrupted by an erroneous determination about multi-feeding can be reduced with certainty.

Heretofore, the two embodiments have been described, but, without being limited to these embodiments, configurations resulting from appropriately combining any one or ones of the following modification examples with the two embodiments can be employed.

Modification Example 1

In the above individual embodiments, the controller 100 interrupts the transport and the reading of the paper S when the total multi-feeding determination number has reached n, but the controller 100 may interrupt the transport and the reading of the paper S when it has been determined even once that there is a possibility of the occurrence of multi-feeding, that is, when an output signal satisfying Vo≤V2 has been output even once.

Further, as a further modification example, in the above individual embodiments, the controller 100 interrupts the transport and the reading of the paper S when the total multi-feeding determination number for the same paper S has reached n, but the controller 100 may interrupt the transport and the reading of the paper S when it has been successively determined more than or equal to n times that there is a possibility of the occurrence of multi-feeding, that is, when an output signal satisfying Vo≤V2 has been successively output more than or equal to n times.

Modification Example 2

Further, the controller 100 may change the value of "n" for the total multi-feeding determination number in accordance with an initially set reading resolution and/or transport speed of the paper S. Further, the value of "n" for the threshold number of the total multi-feeding determination number may be set to any value by a user.

Further, as a further modification example, the controller 100 may determine whether or not there is a possibility of the occurrence of multi-feeding by means of, not the method using the total multi-feeding determination number, but a method of determining whether or not an output signal satisfying Vo≤V2 has been output during a period of time longer than or equal to a threshold period of time. In this case, an output period of time of such an output signal may be measured using a timer or the like. Moreover, the controller 100 may determine whether or not there is a possibility of the occurrence of multi-feeding by means of a method of determining whether or not the total of output periods of time of an output signal satisfying Vo≤V2 for the same paper S is longer than or equal to a threshold period of time.

Further, as a further modification example, the controller 100 may determine whether or not there is a possibility of the occurrence of multi-feeding by means a method of determining whether or not a transport distance by which the paper S has been transported during the output of an output signal satisfying Vo≤V2 is longer than or equal to a threshold distance. Moreover, the controller 100 may determine whether or not there is a possibility of the occurrence of multi-feeding by means of a method of determining whether or not the total of transport distances by each of which the paper S has been transported during the output of an output signal satisfying Vo≤V2 is longer than or equal to a threshold distance.

Modification Example 3

Further, in the above individual embodiments, when Vo>V0 is satisfied, the result of the determination having been made by the controller 100 is the "paper absence" state, but Vo≥V0 may be used as the condition for the relevant determination. Further, in the first embodiment, when V1<Vo≤V0 is satisfied, the result of the determination having been made by the controller 100 is that the paper S is the regular paper S2, but V1≤Vo≤V0, V1<Vo<V0, or V1≤Vo<V0 may be used as the condition for the relevant determination. Similarly, when V2<Vo≤V1 is satisfied, the result of the determination having been made by the controller 100 is that the paper S is the multi-layered paper S1, but V2≤Vo≤V1, V2<Vo≤V1, or V2≤Vo<V1 may be used as the condition for the relevant determination. Further, in the above individual embodiments, when Vo≤V2 is satisfied, the result of the determination having been made by the controller 100 is that there is a possibility of the occurrence of multi-feeding, but Vo<V2 may be used as the condition for the relevant determination.

Modification Example 4

Further, in the above second embodiment, the controller 100 acquires the kind of paper S having been set through the operation section 70, but the controller 100 may specify the kind of paper S based on the result of a detection made by a paper detection means that optically detects the size and the thickness of the paper S, and may acquire the specified kind of paper S. Further, the controller 100 may specify the kind of paper S based on information included in the scan data resulting from the reading by the image reading section 40, and may acquire the specified kind of paper S. It can be considered to specify the kind of paper S based on, for example, the presence or absence of, or the shape of a mark given on the paper S and indicating the kind of paper S.

Moreover, as a further modification example, the controller 100 may make a paper determination based on kinds of paper S having been acquired by means of a plurality of methods, such as a method using the results of detections having been made by the sonic wave detection section 20, a method using a setting having been made through the operation section 70, a method using the result of reading having been performed by the image reading section 40, and the like. The controller 100 may be configured such that, when the result of the paper determination is that there is a possibility that the paper S is the multi-layered paper S1, the controller 100 performs the particular determination processing, and when the result of the paper determination is that there is no possibility that the paper S is the multi-layered paper S1, the controller 100 performs the normal determination processing. That is, the controller 100 may determine which of the normal determination processing and the particular determination processing is to be performed, based on the result of a determination by a paper determination section that makes a paper determination by means of some kind of method, and the results of determinations about multi-feeding by the sonic wave detection section 20.

Modification Example 5

Further, in the above individual embodiments, the controller 100 determines whether or not the kind of paper S is the multi-layered paper S1, but when the image reading apparatus 1 of the present embodiments is applied to a scanner dedicated to photo paper, processes for use in determining the kind of paper S may be omitted. That is, in the first embodiment, S06 and S07 of FIG. 6 may be omitted, and in the second embodiment, S76 and S77 of FIG. 13 may be omitted.

Modification Example 6

Further, in the above individual embodiments, the output section 90 outputs the image file to the host apparatus 200, but the output section 90 may output the image file to a display means to allow the display means to display the scan images, and/or may output the image file to a printing means to allow the printing means to perform printing of the scan images. In this case, based on the multi-feeding occurrence determination information, the output section 90 may allow the scan images with some kind of decoration made thereon to be displayed and/or printed.

Modification Example 7

In the above individual embodiments, in the image reading section 40, a light source switching method that allows the image sensor 43 to read images while allowing each of the colors of the light source 41 to be sequentially switched is employed, but any other reading method, such as a color sensor method that allows color filters to be disposed on the image sensor 43, and allows images to be read using a white light source, or the like.

Modification Example 8

In the above individual embodiments, the image reading apparatus 1 including only the scanner function is exemplified, but the present disclosure may be applied to a multi-function machine including a printing function of performing printing output, a facsimile function of performing FAX output, an external memory function of outputting files to an external memory, a display function of performing display output of scan images, and any other function.

Modification Example 9

In the above individual embodiments, on the assumption that the further the reception intensity of the sonic wave receiver 23 increases, the further the value of the output signal of the sonic wave receiver 23 also increases, the controller 100 makes the determinations though the comparisons of the output signals with the individual kinds of determination threshold values, but the controller 100 is capable of making the determinations through the comparisons even in a configuration in which the sonic wave receiver 23 outputs output signals in a way inverse to that of the assumption. In this case, it is enough to just to reverse the magnitude relationship for the individual kinds of determination threshold values.

Further, as a further modification example, a configuration in which the controller 100 makes determinations through comparisons of the reception intensities of the sonic wave receivers 23 with individual kinds of determination threshold values may be employed.

Modification Example 10

In the above individual embodiments, in the multi-feeding error processing (see FIG. 10), the controller 100 brings the transport motor 14 to a halt, but without bringing the transport motor 14 to a halt, the controller 100 may notify a user of a situation in which the possibility of the occurrence of multi-feeding is high. Meanwhile, in the particular output processing (see FIG. 12), after the completion of the transport of the paper S, the controller 100 notifies a user of a situation in which there is a possibility of the occurrence of multi-feeding, but the controller 100 may notify the user of a situation in which the possibility of the occurrence of multi-feeding is low. That is, the controller 100 may determine that the possibility of the occurrence of multi-feeding in the multi-feeding error processing is higher than that in the particular output processing, and may notifies a user of the result of the relevant determination.

Further, as a further modification example, a configuration in which, in the particular output processing, the controller 100 brings the transport motor 14 to a halt, and notifies a user of a situation in which the possibility of the occurrence of multi-feeding is low may be employed. Other Modification Examples A method for executing the individual processes performed by the image reading apparatus 1 and having been described in the above individual embodiments and modification examples, a program for executing the individual processes performed by the image reading apparatus 1, and a non-transitory computer-readable storage medium storing the program therein are also included within the scope of the rights of the present disclosure. In addition, modifications can be appropriately made within the scope not departing the gist of the present disclosure.

What is claimed is:

1. A transport apparatus comprising:
    a transport section configured to transport at least one sheet of paper along a transport path;
    a sonic wave detection section including a sonic wave transmitter and a sonic wave receiver that are disposed at positions between which the transport path is interposed, the sonic wave detection section being configured to output an output signal having a value that varies in accordance with a reception intensity with which the sonic wave receiver has received a sonic wave transmitted from the sonic wave transmitter; and
    a controller configured to determine that a second case has a higher possibility of an occurrence of multi-feeding than a first case, the first case being a case in which, during the transport of the at least one sheet of paper, a first output signal corresponding to a reception intensity smaller than a first threshold value and larger than a second threshold value and a second output signal corresponding to a reception intensity smaller than the second threshold value have been output for an identical sheet of paper among the at least one sheet of paper, the second case being a case in which, during the transport of the at least one sheet of paper, a third output signal corresponding to a reception intensity larger than the first threshold value and the second output signal have been output for an identical sheet of paper among the at least one sheet of paper.

2. The transport apparatus according to claim 1, further comprising a notification section, wherein, when the second output signal has been output during the transport of the at least one sheet of paper, the controller allows the notification section to notify of a possibility of an occurrence of multi-feeding.

3. The transport apparatus according to claim 1, wherein the sonic wave detection section outputs the first output signal during the transport of at least one sheet of paper of a first kind, and outputs the third output signal during the transport of at least one sheet of paper of a second kind different from the first kind.

4. The transport apparatus according to claim 3, wherein the at least one sheet of paper of the first kind is a sheet of photo paper and the at least one sheet of paper of the second kind is a sheet of regular paper.

5. The transport apparatus according to claim 1, wherein, when, during the transport of the at least one sheet of paper, the second output signal for which an output period of time is longer than or equal to a threshold period of time and the third output signal have been output for an identical sheet of paper among the at least one sheet of paper, the controller interrupts the transport.

6. The transport apparatus according to claim 5, wherein, when, during the transport of the at least one sheet of paper, the second output signal for which a total of an output period of time for an identical sheet of paper among the at least one sheet of paper is longer than or equal to the threshold period of time and the third output signal have been output for an identical sheet of paper among the at least one sheet of paper, the controller interrupts the transport.

7. The transport apparatus according to claim 1, further comprising an image reading section configured to read the at least one sheet of paper during the transport of the at least one sheet of paper, wherein the controller allows a scan image to be generated based on a result of the reading by the image reading section.

8. The transport apparatus according to claim 1, wherein the controller is configured to, as the determination, make a determination that, in the first case, the controller does not allow a notification to be made as a multi-feeding error and that, in the second case, the controller allows a notification to be made as the multi-feeding error.

9. A transport apparatus comprising:
a transport section configured to transport at least one sheet of paper along a transport path;
an acquisition section configured to acquire a kind of the at least one sheet of paper;
a sonic wave detection section including a sonic wave transmitter and a sonic wave receiver that are disposed at positions between which the transport path is interposed, the sonic wave detection section being configured to output an output signal having a value that varies in accordance with a reception intensity with which the sonic wave receiver has received a sonic wave transmitted from the sonic wave transmitter; and
a controller configured to determine that a second case has a higher possibility of an occurrence of multi-feeding than a first case, the first case being a case in which the at least one sheet of paper of the acquired kind is at least one sheet of paper of a first kind and an output signal corresponding to a reception intensity smaller than a threshold value has been output during the transport of the at least one sheet of paper, the second case being a case in which the at least one sheet of paper of the acquired kind is at least one sheet of paper of a second kind different from the first kind and an output signal corresponding to the reception intensity smaller than the threshold value has been output during the transport of the at least one sheet of paper.

10. The transport apparatus according to claim 9, wherein the at least one sheet of paper of the first kind is a sheet of photo paper and the at least one sheet of paper of the second kind is a sheet of regular paper.

11. An image file generation method for an image reading apparatus that generates an image file by reading at least one sheet of paper transported along a transport path, the method comprising:
a sonic wave detection process in which a sonic wave transmitter transmits a sonic wave, a sonic wave receiver receives the sonic wave, the sonic wave transmitter and the sonic wave receiver being disposed at positions between which the transport path is interposed, and the sonic wave receiver outputs an output signal having a value that varies in accordance with a reception intensity with which the sonic wave receiver has received the sonic wave; and
a generation process in which, when, during the transport of the at least one sheet of paper, a first output signal corresponding to a reception intensity smaller than a first threshold value and larger than a second threshold value and a second output signal corresponding to a reception intensity smaller than the second threshold value have been output for an identical sheet of paper among the at least one sheet of paper, an image signal including a scan image based on a result of the reading of the at least one sheet of paper and multi-feeding occurrence determination information indicating that there is a possibility of an occurrence of multi-feeding is generated, and when, during the transport of the at least one sheet of paper, the second output signal and a third output signal corresponding to a reception intensity larger than the first threshold value have been output for an identical sheet of paper among the at least one sheet of paper, the image signal is not generated.

12. An image file generation method for an image reading apparatus that generates an image file by reading at least one sheet of paper transported along a transport path, the method comprising:
an acquisition process in which a kind of the at least one sheet of paper is acquired;
a sonic wave detection process in which a sonic wave transmitter transmits a sonic wave, a sonic wave receiver receives the sonic wave, the sonic wave transmitter and the sonic wave receiver being disposed at positions between which the transport path is interposed, and the sonic wave receiver outputs an output signal having a value that varies in accordance with a reception intensity with which the sonic wave receiver has received the sonic wave; and
a generation process in which, when the at least one sheet of paper of the acquired kind is at least one sheet of paper of a first kind and, during the transport of the at least one sheet of paper, an output signal corresponding to a reception intensity smaller than a threshold value has been output, an image signal including a scan image based on a result of the reading of the at least one sheet of paper and multi-feeding occurrence determination information indicating that there is a possibility of an occurrence of multi-feeding is generated, and when the at least one sheet of paper of the acquired kind is at least one sheet of paper of a second kind different from the first kind and, during the transport of the at least one sheet of paper, an output signal corresponding to the reception intensity smaller than the threshold value has been output, the image signal is not generated.

* * * * *